United States Patent [19]

Kawai

[11] Patent Number: 4,906,053
[45] Date of Patent: Mar. 6, 1990

[54] QUICK-RELEASE TYPE CLAMPING ASSEMBLY FOR BICYCLE HUB

[75] Inventor: Mamoru Kawai, Matsumoto, Japan

[73] Assignee: Sansin Engineering, Inc., Nagano, Japan

[21] Appl. No.: 321,855

[22] Filed: Mar. 10, 1989

[30] Foreign Application Priority Data

Apr. 18, 1988 [JP] Japan .............................. 63-51962[U]

[51] Int. Cl.⁴ ............................................ B60B 27/02
[52] U.S. Cl. .................................. 301/105 B; 301/111
[58] Field of Search ............... 301/105 R, 105 B, 111, 301/112, 114, 115, 124 R, 121

[56] References Cited

U.S. PATENT DOCUMENTS 2,630,020  3/1953  Juy ..................................... 301/105 B
4,477,121 10/1984  Atkins ................................. 301/112
4,770,011  9/1988  Constant ......................... 301/111 X

FOREIGN PATENT DOCUMENTS 57-12301  1/1982  Japan .
62-127004  8/1987  Japan .

Primary Examiner—Russell D. Stormer
Attorney, Agent, or Firm—William H. Eilberg

[57] ABSTRACT

A quick-release type clamping assembly for a bicycle hub comprises a tie rod having a threaded portion at one end and formed at the other end with an enlarged head. An end nut is screwed on the threaded portion of the tie rod. A presser member is fitted around the enlarged head, the presser member being movable relative to the enlarged head axially of the tie rod toward and away from the end nut in response to pivotal movement of an operating lever. A hub stopper is provided to surround at least one of the end nut and the presser member. The stopper is movable axially of the tie rod between an advanced position and a retreated position, and has a engaging portion for engagement with a corresponding fork end to prevent the hub from displacing relative to the fork end when the stopper assumes the advanced position. A locking mechanism holds the hub stopper in the advanced position.

10 Claims, 3 Drawing Sheets

QUICK-RELEASE TYPE CLAMPING ASSEMBLY FOR BICYCLE HUB

BACKGROUND OF THE INVENTION

1. Field of the Invention

This invention relates to a quick-release type clamping assembly for releasably or removably mounting a wheel hub to a pair of fork ends of a bicycle frame. It relates more particularly to such a clamping assembly which is improved to prevent unexpected removal or detachment, from the fork ends, of the hub in its mounted condition.

2. Description of the Prior Art

In bicycles, generally, it is often required to remove a wheel hub from a pair of fork ends of a bicycle frame for replacement or repair for example. For this purpose, Japanese Utility Model Application Laid-open No. 57-12301 (Laid-open: Jan. 22, 1982; Application No.: 55-90471; Filed: June 26, 1980; Applicant: Shimano Industrial Company Limited; Inventor: Keizo SHIMANO) discloses a quick-release type clamping assembly for a bicycle hub which enables quick removal of the hub when required.

More particularly, the clamping assembly of the above laid-open utility model application comprises a tie rod extending through a tubular hub shaft on which is rotatably supported a hub shell between a pair of fork ends. The tie rod has one end screwed to an end nut positioned axially outwardly from one fork end. The other end of the rod is provided with an enlarged head positioned axially outwardly from the other fork end and having a cam hole extending transversely of the rod. A hollow presser member is fitted around the enlarged head and axially movable relative thereto toward and away from the end nut. A lever, which is pivotable about a pivotal axis between a clamping position and a releasing position, is mounted to the presser member and has a cam portion received within the cam hole and eccentric relative to the pivotal axis.

When the lever is pivoted to the clamping position, the presser member is moved axially inwardly toward the end nut due to the eccentricity of the cam portion. As a result, the distance between the end nut and the presser member is reduced to clamp the hub (hub shaft and hub shell) to the fork ends.

Conversely, when the lever is pivoted to the releasing position, the presser member is moved axially outwardly away from the end nut, so that the hub and the fork ends are relieved from the previous clamping force to enable removal of the hub (wheel).

As described above, the quick-release type clamping assembly has an advantage of enabling quick mounting and removal of the hub. However, in such a clamping assembly, it is necessary to properly adjust the clamping force by previously selecting the initial axial position of the end nut on the tie rod. If this initial adjustment is improper, the clamping force may be insufficient for firmly clamping the hub to the fork ends. Therefore, the hub or the wheel may unexpectedly come off the fork ends during riding. This disadvantage becomes particularly pronounced when running on rough roads.

In order to overcome such a disadvantage, Japanese Utility Model Application Laid-open No. 62-127004 (Laid-open: Aug. 12, 1987; Application No.: 61-15477; Filed: Feb. 5, 1986; Applicant: Sansin Engineering, Inc.; Inventor: Mamoru KAWAI) proposes a quick-release type clamping assembly, which in addition to the elements already described above, comprises a stopper washer interposed between the presser member and a corresponding fork end. Such a washer may be alternatively or additionally interposed between the end nut and the other fork end. The stopper washer has an engaging projection for engagement, from above, with the fork end to prevent the hub from moving downward relative to the fork end.

The provision of the stopper washer serves to prevent the hub from being unexpectedly removed from the fork ends during riding. However, since the washer is arranged in a very small space between the presser member and the corresponding fork end (and/or between the end nut and the other fork end), it is difficult, in a hub mounting operation, to angularly adjust the washer so that it engages a suitable portion of the fork end, thereby detracting much from the quick operability of the clamping assembly. Further, the washer is freely movable on the tie rod and therefore may be easily lost when the end nut is screwed out of the tie rod for removal of the clamping assembly from the hub.

SUMMARY OF THE INVENTION

It is, therefore, an object of the present invention to provide a quick-release type clamping assembly for a bicycle hub which can be easily operated for quick mounting and removal of the hub relative to a pair of fork ends, but which effectively prevents the hub from being unexpectedly or accidentally removed from the fork ends once the hub is mounted.

Another object of the invention is to provide a quick-release type hub clamping assembly in which loss of parts is less likely to occur during operation or handling of the assembly.

A further object of the invention is to provide a quick-release type hub clamping assembly which enables visual inspection by a rider as to whether or not the assembly is in a condition for prevention of unexpected hub removal.

According to the invention, there is provided a quick-release type clamping assembly for a bicycle hub comprising: a tie rod having a threaded portion at one end and formed at the other end with an enlarged head; an end nut screwed on the threaded portion of the tie rod; a presser member fitted around the enlarged head of the tie rod, the presser member being movable relative to the enlarged head axially of the tie rod toward and away from the end nut in response to pivotal movement of an operating lever; a hub stopper surrounding at least one of the end nut and the presser member, the stopper being movable axially of the tie rod between an advanced position and a retreated position, the stopper having engaging means for engagement with a corresponding fork end to prevent the hub from displacing relative to the fork end when the stopper assumes the advanced position; and locking means for releasably holding the hub stopper in the advanced position.

Other objects, features and advantages of the present invention will become apparent from the following description of the preferred embodiments given with reference to the accompanying drawings.

DETAILED DESCRIPTION

Figure 1:
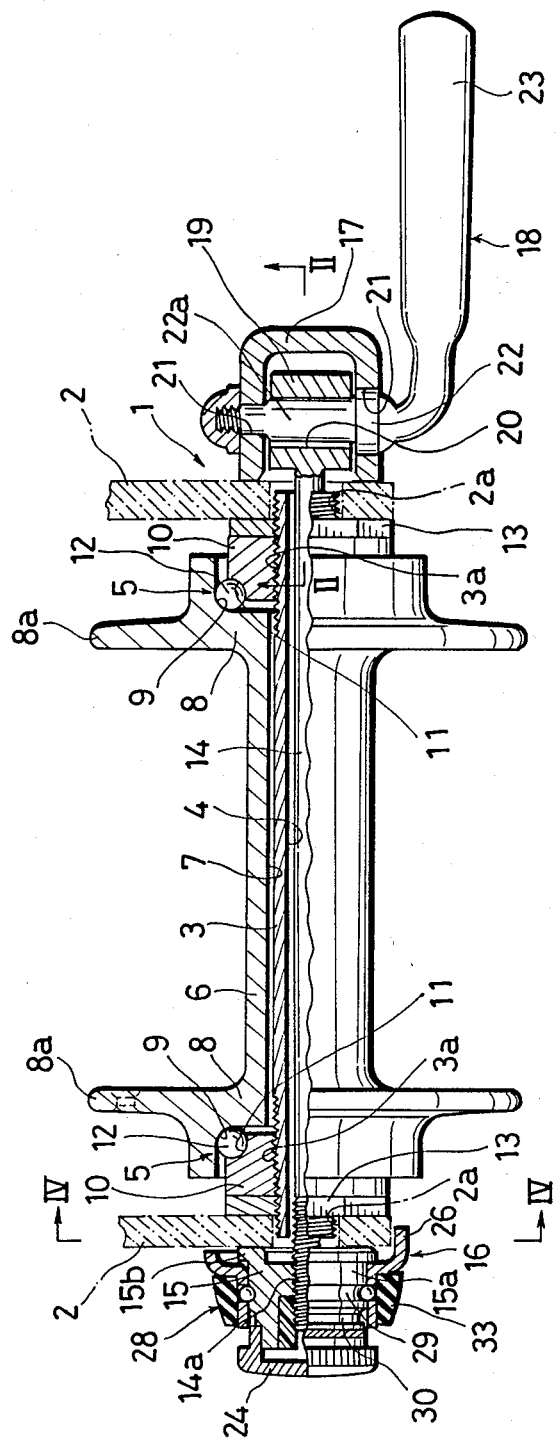
FIG. 1 is a front view, partly in section, of a quick-release type clamping assembly according to the invention as used to mount a wheel hub.

Throughout the accompanying drawings, like parts are referred to by the same reference numerals.

Referring now to FIG. 1, a quick-release type clamping assembly, generally represented by reference numeral 1, is used to releasably or removably mount a bicycle hub to a pair of front or rear fork ends 2. Each fork end is formed with a hub mounting cutout 2a (see also FIG. 4).

The hub comprises a tubular hub shaft 3 having an axial through-bore 4. Rotatably supported on the hub shaft 3 by means of a pair of bearings 5 is a hollow hub shell 6 which has an axial through-bore 7 and a pair of enlarged end portions 8. Each enlarged end portion is integrally formed with a mounting flange 8a to which is connected one end (radially inner end) of each spoke (not shown) having the other end (radially outer end) connected to a wheel rim (not shown). The enlarged end portion is further provided with a cup-shaped inner surface 9 serving as an outer race of a corresponding bearing 5, as described below.

Each bearing 5 includes a ball retainer 10 adjustably screwed onto a corresponding threaded end portion 3a of the hub shaft 3 and formed with a generally conical outer surface 11 which constitutes an inner race. A series of steel balls 12 are interposed between the inner race 11 and its opposed outer race 9, so that the hub shell 6 is free to rotate on the hub shaft 3. A lock nut 13 is screwed onto the threaded end portion of the hub shaft 3 axially outwardly from the retainer 11 to prevent unexpected loosening of the latter. Obviously, the lock nut 13 cooperates with the retainer 10 to form a known double nut.

The quick-release type clamping assembly 1 basically comprises a tie rod 14, a end nut 15 provided with a movable hub stopper 16, a hollow presser member 17, and a lever 18. The details of these parts are described below.

The tie rod 14 extends through the axial through-bore 4 of the hub shaft 3 and has a length which is greater than that of the shaft 3, so that both ends of the rod 14 project out of the shaft 3. One projecting end 14a of the rod 14 is threaded for adjustable screw engagement with the nut 15 which is positioned axially outwardly from one fork end 2.

The other projecting end of the rod 14 is integrally formed with an enlarged head 19 having a cam hole 20 which is elongated in cross section (see FIG. 2) and extends through the head 19 perpendicularly to the rod 14. According to the illustrated example, the head 19 has a cylindrical outer surface.

The presser member 17, which is cylindrical according to the illustrated example, is fitted around the enlarged head 19 of the tie rod 14 at a position axially outwardly from the other fork end 2. The presser member is provided in its wall thickness with a diametrically opposite pair of lever receiving holes 21 substantially in corresponding relation to the cam hole 20. The two lever receiving holes 21, though differing in diameter according to the illustrated example, are coaxial with each other.

The lever 18 has a shaft portion 22 rotatably received in the lever receiving holes 21 of the presser member 17 and extending through the cam hole 20 of the enlarged head 19. The lever 18 further has an arm portion 23 extending perpendicularly from the shaft portion 22. That part of the shaft portion 22 positioned within the cam hole 20 constitutes a cam portion 22a which is eccentric relative to the lever receiving holes 21, as better illustrated in FIG. 2. Thus, when the lever 18 is pivoted back and forth, the eccentric cam portion 22a of the lever 18 displaces axially of the rod 14, causing the presser member 17 to move axially relative to the enlarged head 19 toward and away from the nut 15 to vary the distance between the presser member 17 and the nut 15. Though the eccentric cam portion 22a also moves transversely of the rod 14 upon pivotal movement of the lever 18, such transverse movement of the cam portion 22a is allowed without causing traverse oscillation of the rod 14 because the cam hole 20 is elongated in cross section transversely of the rod 14 (see FIG. 2).

The distinguishing feature of the invention resides in the provision of the hub stopper 16 and its associated parts. For the convenience of explanation, however, these parts will be described after the known basic operation of the quick-release type clamping assembly 1 is described.

For mounting of the hub shell 3 or the wheel to the pair of fork ends 2, the hub shaft 3 are fitted at each threaded end 3a into the mounting cutout 2a of the corresponding fork end 2. In so doing, the lever 18 has been pivoted in the direction of an arrow B in FIG. 2 to maximally increase the distance between the end nut 15 and the presser member 17. Subsequently, the lever 18 is pivoted in the direction of an arrow A to its clamping position shown in FIG. 2. As a result, the cam portion 22a displaces axially outwardly to move the enlarged head 19 of the tie rod 14 axially outwardly relative to the presser member 17 (in other words, axially inward movement of the presser member 17 relative to the enlarged head 19), causing the distance between the nut 15 (FIG. 1) and the presser member 17 to reduce and thereby firmly clamping the fork ends 2. Specifically, one fork end 2 is clamped between the end nut 15 and its corresponding lock nut 13, while the other fork end is sandwiched between the presser member 17 and its corresponding lock nut 13.

For removal of the hub shell 3, the lever 18 is pivoted in the arrow B direction to its releasing position so as to increase the distance between the end nut 15 and the presser member 17. As a result, the hub shaft 3 together with the hub shell 6 (wheel) can be removed from the fork ends 2.

Thus, the bicycle hub incorporating the quick-release type clamping assembly 1 can be quickly removed from and re-mounted to the pair of fork ends 2 for replacement or repair.

Figure 2:
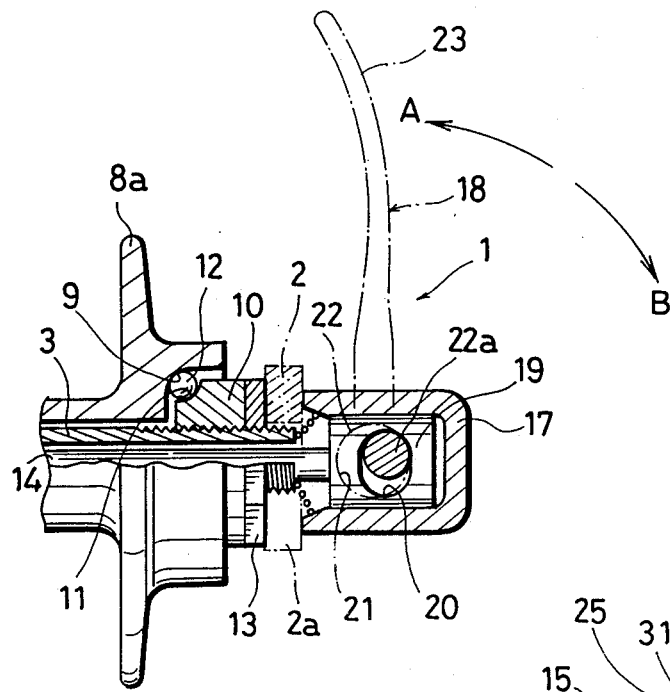
FIG. 2 is an enlarged partial section taken on lines II—II in FIG. 1 showing the clamping assembly in a releasing state.

The axial position of the end nut 15 may be altered by screwably advancing or retreating on the threaded end 14a of the tie rod 14, thereby adjusting the clamping force obtainable upon pivoting the lever 18 in the clamping direction (arrow A in FIG. 2). To facilitate such adjustment, the nut 15 is provided at its outer end with an operating knob 24 for integral rotation therewith. This knob, which may be press-fitted onto the end nut, has a knurled head 24a to further facilitate rotation of the end nut.

Figure 3:
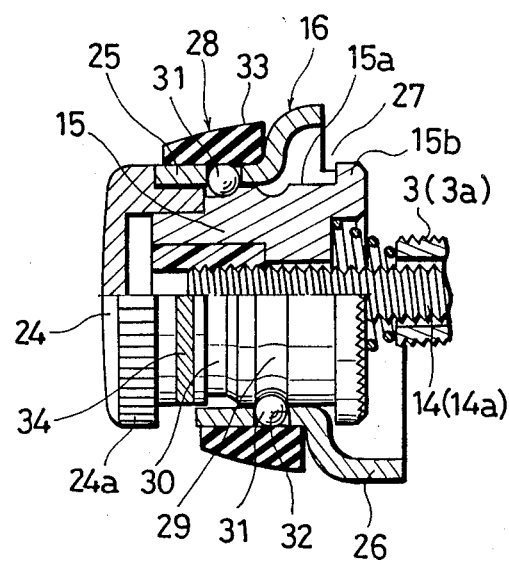
FIG. 3 is an enlarged fragmentary view, partly in section, showing a hub stopper in two different positions.

The end nut 15 provides a substantially cylindrical outer surface 15a, as better illustrated in FIG. 3. Further, the end nut is formed at its inner end with an engaging flange 15b for abutment with the corresponding fork end 2 (see FIG. 1).

According to the embodiment of the invention illustrated in FIG. 1, the hub stopper 16 is fitted around the end nut 15. The hub stopper is movable axially of the hub shaft 3 to assume an advanced position (see FIG. 1 or the lower half of FIG. 3) for engagement with the corresponding fork end 2, and a retreated position (see the upper half of FIG. 3) for disengagement therefrom. The excessive retreating movement of the hub stopper is prevented by coming into abutment with the knurled head 24a of the knob 24.

Figure 4:
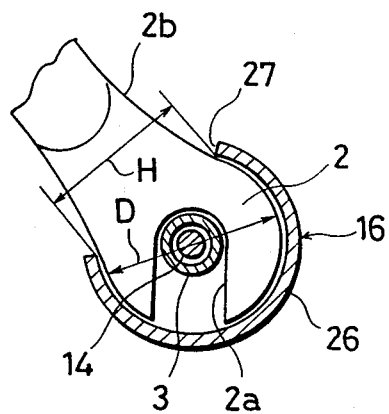
FIG. 4 is a sectional view taken on lines IV—IV in FIG. 1.

As illustrated in FIG. 3, the hub stopper 16 includes a cylindrical guide portion 25 for slidably fitted on the cylindrical outer surface of the end nut 15, and an enlarged engaging portion 26 extending axially inward from the guide portion 25. According to the illustrated example, the engaging portion 26 is also substantially cylindrical and diametrically larger than the corresponding fork end 2 for fitting therearound, as shown in FIG. 4. However, the engaging portion 26 has a cutout 27 for allowing the fork stay 2b to extend out therethrough. The cutout 27 has a width H which is smaller than the diameter D of the fork end 2. Thus, the engaging portion 26, once fitted over the fork end, serves to prevent the hub from being unexpectedly removed downward from the fork end even if the clamping force provided by the clamping movement of the presser member 17 decreases for some reason.

Obviously, it is necessary to hold the hub stopper 16 in its advanced position for engagement with or fitting over the corresponding fork end 2. For this purpose, there is provided a stopper locking mechanism 28.

The stopper locking mechanism 28, according to the example shown in FIG. 3, comprises a pair of annular engaging grooves 29, 30 formed on the cylindrical outer surface 15a of the end nut 15 as axially spaced from each other, and an annular series of steel balls 31 which are retained in a corresponding annular series of holes 32 of the hub stopper guide portion 25. The ball series 31 is radially pressed inward by a rubber ring 33 fitted onto the hub stopper guide portion 25. Thus, the ball series 31 can be held engaged with a selected one of the annular grooves 29, 30 to prevent axial sliding movement of the hub stopper 16, but may be manually forced out of the selected groove for engagement with the other groove.

When mounting the hub to the pair of fork ends 2, as hereinbefore described, the hub stopper 16 is brought to its retreated position in which the ball series 31 engages in the axially outer annular groove 30 of the end nut 15 (see the upper half of FIG. 3). Upon completion of such a mounting operation, the hub stopper is axially brought to its advanced position in which the ball series 31 engages in the axially inner groove 30. In so doing, naturally, the hub stopper must be angularly adjusted so that the cutout 27 coincides with the fork stay 2b. As a result, the hub stopper is held engaged with the corresponding fork end 2 to prevent unexpected detachment of the hub or wheel during riding.

Preferably, the knob 24 may be formed with a marking 34, particularly a colored marking, which is hidden when the hub stopper 16 is brought to the retreated position, but exposed when the hub stopper is brought to the advanced position. In this way, it is possible to visually confirm, even during riding, whether or not the hub stopper is in its working position for prevention of hub removal. Such a marking may be formed on the outer cylindrical surface 15a of the end nut 15 in case the knob 24 is omitted or press-fitted into the end nut.

The engaging portion 26 of the hub stopper 16 may be formed with an additional cutout which is diametrically opposite to but dimensionally identical to the cutout 27 already described. In this case, either of the two cutouts may be used to allow the fork stay 2b to extend out, so that it becomes easier to angularly adjust the hub stopper 16 for engagement with (or fitting over) the fork end 2.

According to the illustrated example, the hub stopper 26 is provided around the end nut 15. However, such a hub stopper together with its associated parts may be provided additionally or alternatively around the presser member 17. In this case, the presser member 17 may be axially extended to provide a sufficient distance between the lever shaft portion 22 and the corresponding fork end 2, thereby enabling the alternative or additional hub stopper to slide axially of the hub shaft 3.

Figure 5:
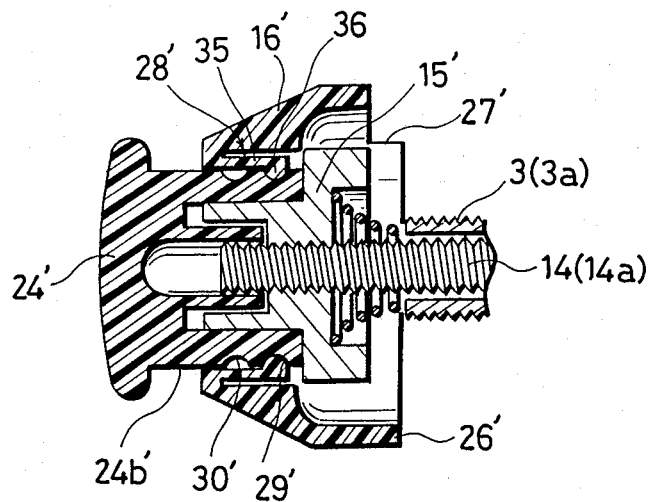
FIG. 5 is a sectional view showing another hub stopper according to the invention.

According to the second embodiment shown in FIG. 5, an operating knob 24' press-fitted to an end nut 15' for integral rotation therewith provides an axially extended outer cylindrical surface 24b' which is formed with a pair of axially spaced annular engaging grooves 29', 30'. A hub stopper 16', which is made of a resinous material according to this embodiment, is slidably fitted on the outer cylindrical surface 24b' of the knob 24'. The stopper 16' has a substantially cylindrical engaging portion 26' with a cutout 27'. Further, the stopper has an integral guide tube 35 which is formed with an engaging projection 36 for engagement with a selected one of the engaging grooves 29', 30'. The guide tube 35 is elastically deformable so as to allow sliding movement of the hub stopper 16' between its advanced and retreated positions.

The hub stopper 16' of the second embodiment is functions substantially in the same way as that of the first embodiment described above. The stopper locking mechanism 28', which is provided by the engaging grooves 29', 30', the guide tube 35 and the engaging projection 36, serves to hold the hub stopper 16' at a selected one of the advanced and retreated positions.

Figure 6:
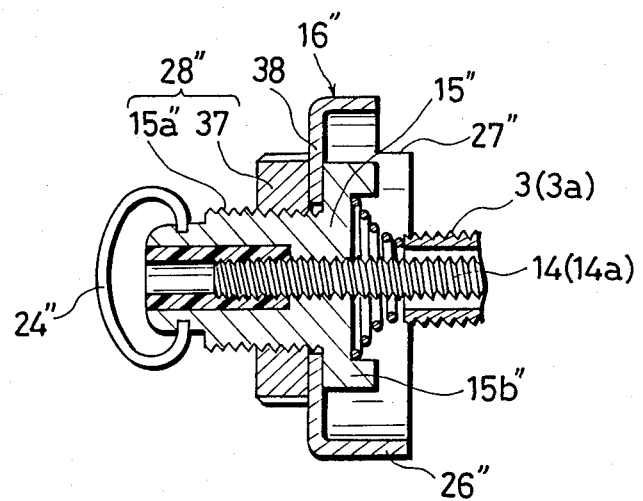
FIG. 6 is a sectional view showing a further hub stopper according to the invention.

In the third embodiment represented in FIG. 6, an end nut 15" rotatable by means of an operating loop 24" has a threaded outer cylindrical surface 15a" to which is screwed an adjusting nut 37. A hub stopper 16" has a cylindrical engaging portion 26" with a cutout 27". The stopper further has a discal portion 38 surrounding the threaded surface 15a" of the end nut 15" as interposed between the engaging flange 15b" of the nut and the adjusting nut 37. Apparently, the threaded surface 15a" and the adjusting nut 37 constitute a stopper locking mechanism 28".

According to the third embodiment, the hub stopper 16" is retreated by screwably retreating the adjusting nut 37 for mounting of the hub, whereas the stopper is locked in its advanced position by screwably advancing the adjusting nut upon completion of such mounting.

The invention being thus described, it is obvious that the same may be varied in many other ways. For instance, the hub stopper may be fitted on the end nut or the operating knob or the presser member with a sufficient friction to resist a relatively large axial force without movement of the stopper. Such variations are not to be regarded as a departure from the spirit and scope of the invention, and all such modifications as would be obvious to those skilled in the art are intended to be included within the scope of the following claims.

I claim:

1. A quick-release type clamping assembly for a bicycle hub comprising:
   a tie rod having a threaded portion at one end and formed at the other end with an enlarged head;
   an end nut screwed on said threaded portion of said tie rod;
   a presser member fitted around said enlarged head of said tie rod, said presser member being movable relative to said enlarged head axially of said tie rod toward and away from said end nut in response to pivotal movement of an operating lever;
   a hub stopper surrounding at least one of said end nut and said presser member, said stopper being movable axially of said tie rod between an advanced position and a retreated position, said stopper having engaging means for engagement with a corresponding fork end to prevent the hub from displacing relative to said fork end when said stopper assumes said advanced position; and
   locking means for releasably holding said hub stopper in said advanced position.

2. The clamping assembly as defined in claim 1, wherein said hub stopper has a substantially cylindrical engaging portion which is slightly larger in diameter than said fork end for fitting therearound to serve as said engaging means.

3. The clamping assembly as defined in claim 2, wherein said engaging portion of said hub stopper has at least one cutout for allowing a fork stay to extend therethrough from said fork end, said cutout having a width smaller than the diameter of said fork end.

4. The clamping assembly as defined in claim 1, further comprising a marking provided radially inwardly from said hub stopper, said marking being visually hidden when said hub stopper assumes said retreated position, but exposed when said hub stopper assumes said advanced position.

5. The clamping assembly as defined in claim 1, wherein said hub stopper has a cylindrical guide portion slidably movable on a cylindrical guide surface.

6. The clamping assembly as defined in claim 5, wherein said locking means comprises a pair of axially spaced annular engaging grooves formed on said guide surface, an annular series of balls retained in a corresponding annular series of holes formed in said guide portion of said hub stopper, and an annular elastic member fitted around said guide portion of said hub stopper to urge said series of balls radially inwardly into engagement with a selected one of said engaging grooves.

7. The clamping assembly as defined in claim 6, wherein said elastic member is a rubber ring.

8. The clamping assembly as defined in claim 5, wherein said locking means comprises a pair of axially spaced annular engaging grooves formed on said guide surface, and an annular engaging projection formed on said guide portion of said hub stopper for engagement with a selected one of said engaging grooves, said guide portion of said hub stopper being elastically deformable.

9. The clamping assembly as defined in claim 8, wherein said hub stopper is made of a resinous material.

10. The clamping assembly as defined in claim 1, wherein said hub stopper has a discal portion surrounding a cylindrical surface which is bounded by an annular flange, and said locking means comprises threads formed on said cylindrical surface, and an adjusting nut engageable with said threads, said discal portion being sandwiched between said adjusting nut and said annular flange when said adjusting nut is screwably advanced.

* * * * *